United States Patent [19]

Carter

[11] 3,717,854

[45] Feb. 20, 1973

[54] CONDUCTOR GRIDS FOR POST AND FILM MEMORY SYSTEMS

[75] Inventor: Kenneth R. Carter, Woodland Hills, Calif.

[73] Assignee: Litton Systems, Inc., Beverly HIlls, Calif.

[22] Filed: July 14, 1971

[21] Appl. No.: 162,391

[52] U.S. Cl.....340/174 VA, 340/174 CC, 340/174 M

[51] Int. Cl.............................G11c 5/08, G11c 11/10

[58] Field of Search......................340/174 VA, 8 CC

[56] References Cited

UNITED STATES PATENTS 3,428,956 2/1969 Bobeck..........................340/174 VA

*Primary Examiner*—Bernard Konick
*Assistant Examiner*—Jay P. Lucas
*Attorney*—Alan C. Rose et al.

[57] ABSTRACT

A conductor grid for a post and film memory system comprises first elongated, flat conductors having arms extending orthogonally to the length of the conductors. The conductors may be assembled to a post structure having orthogonal slots so that the conductors will fit snuggly in one set of slots and the arms will extend into the orthogonal slots at the intersections of the orthogonal slots.

6 Claims, 4 Drawing Figures

KENNETH R. CARTER
INVENTOR

BY Robert M. Angus
ATTORNEY

CONDUCTOR GRIDS FOR POST AND FILM MEMORY SYSTEMS

This invention relates to grid patterns for memory systems, and particularly to improved grid patterns having greater mechanical integrity than heretofore achieved.

"Post and film" memory systems are characterized by a plurality of ferrite posts exhibiting a relatively low reluctance and arranged in a predetermined pattern on a support. Overlying the tops of the posts is a film of anisotropic material exhibiting a substantially rectangular hysteresis loop and a high remanence. A grid of a plurality of conductors is disposed within slots between the posts. Ordinarily, first and second grids of conductors are provided within the slots between the ferrite posts for reading and writing information to and from memory. For example, signals applied to the conductors of the write grid causes magnetic dipoles within the film above each post to be oriented in a predetermined pattern to store information in the memory. The orientation of dipoles in the film can be sensed, or read, via conductors of the read grid.

Heretofore, the conductors had been constructed of individual wires laced through the slots between the ferrite posts. One example of such a laced conductor grid pattern is described in the U.S. Pat. to Bobeck, No. 3,428,956. However, since the posts of the memory system are small, it has been difficult to accurately position the conductors within the slots. Furthermore, if several conductor grids were required for read and write purposes, it has been necessary to insulate the conductors from each other.

It has been proposed to fabricate the grid pattern by etching a sheet of conductive material into the desired conductor grid pattern. However, the mechanical integrity of such a grid pattern after it has been etched was not adequate for assemblage purposes, thereby rendering such grid pattern difficult to handle for assembly to the ferrite posts. Further, the poor mechanical characteristics of such prior grids resulted in the failure of the grid during assembly procedures.

It is an object of the present invention to provide a grid pattern having greater mechanical integrity than heretofor achieved.

It is another object of the present invention to provide an etched conductor grid pattern for commercial use in a post and film memory system.

In accordance with the present invention, a grid pattern is constructed by etching away portions of a conductor sheet to form a plurality of conductors arranged in a predetermined grid pattern. Each conductor is adapted to be positioned in a slot between posts of a ferrite grid for use in a post and film memory system. An arm or tee portion is provided on each conductor at each intersection of the slots, the arms extending in a direction orthogonal to the length of the conductor.

One feature of the present invention resides in the fact that when the conductor grid is assembled to the post structure, the shoulders provide a region of increased strength. In situations where two such grids are utilized for read and write purposes, and are separated by a layer of insulating material, the insulator layer is sandwiched between the shoulders of one grid and the body of the other, thereby increasing the mechanical integrity of the grids and the insulator.

The above and other features of this invention will be more fully understood from the following detailed description and the accompanying drawings, in which.

Figures 1, 2, 3, 4:
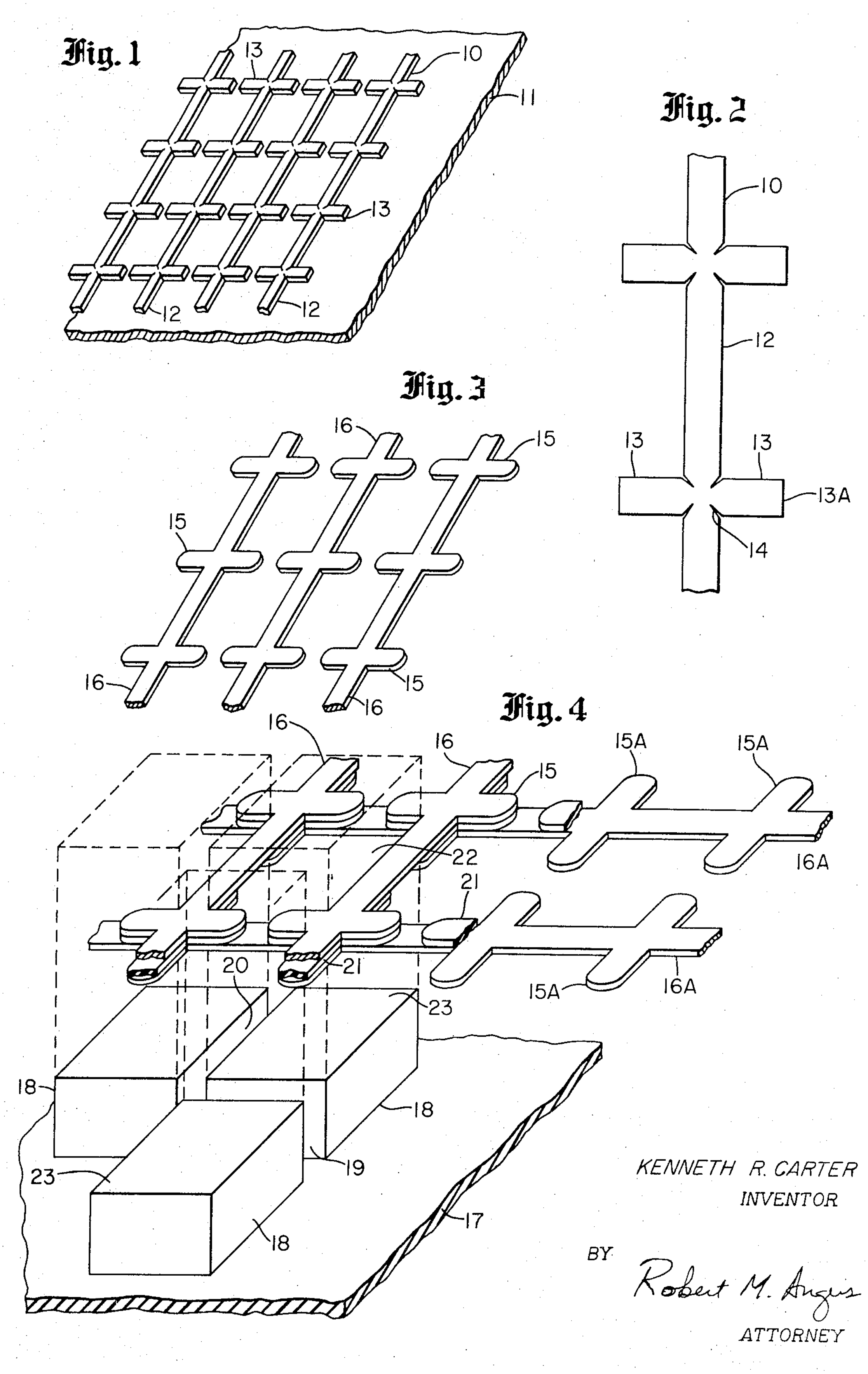
FIG. 1 is a perspective view of a portion of a mask overlaying a sheet of conductor material for constructing a conductor grid pattern in accordance with the presently preferred embodiment of the present invention.
FIG. 2 is a top view elevation of a portion of the mask illustrated in FIG. 1.
FIG. 3 is a perspective view of a portion of a grid pattern in accordance with the presently preferred embodiment of the present invention.
FIG. 4 is a perspective view of a portion of a pair of grid patterns in accordance with the present invention for assembly to a ferrite post pattern for a memory system.

Referring to FIGS. 1 and 2, there is illustrated a mask 10 for etching a grid pattern of conductors from a sheet 11 of conductive material, such as copper. Mask 10 includes an elongated portion 12 having a plurality of arms or tees 13 extending orthogonally to the length of portion 12. A plurality of serifs 14 extend into the mask at the intersection of each arm 13 with portion 12. Mask 10 is positioned over sheet 11 in a desired configuration so that the end surfaces 13*a* of shoulders 13 of juxtaposed portions 12 are spaced apart a short distance, such as a few mils. By way of example, mask 10 may be fabricated onto sheet 11 by well known photographic methods.

The end surfaces 13*a* of the shoulders are located at right angles to the shoulder bodies. When an etchant is applied to exposed surfaces of sheet 11, the etchant may undercut the shoulders a predetermined amount to form elliptical shoulders in the sheet. Also, the provision of serifs 14 assure a substantially right angle intersection at the junction of the shoulders and elongated portions of the resultant device.

An etchant is applied to sheet 11 to etch away exposed portions of sheet 11. The copper sheet may be supported on an insulator sheet (not shown), such as glass epoxy, which may be removed after fabrication of the grid structure. Such an insulator sheet would support the copper conductor layer during fabrication, and would be etched away with a solution of sulphuric and hydrofluric acids. Alternatively, the glass may be removed by subjecting the exposed glass to 10.6$\mu$ m radiation from a Q-pulsed $CO_2$ laser.

The grid structure resulting from the process is illustrated in FIG. 3. The grid structure comprises a plurality of elongated conductors 16 each having a plurality of semi-elliptical arms 15 extending orthogonally to the length thereof. As will be more fully understood hereinafter, the shoulders are located at the intended intersection of slots of the ferrite structure of the memory system. Typically, the copper conductors are substantially flat and may have a thickness of about 1.4 mils, a width of about 3.0 mils, and may be spaced apart by about 17.0 mils to accommodate the ferrite posts. Such ferrite posts ordinarily are 15.0 × 15.0 mils in cross-section, so the spacing between arms 15 on the conductors is also about 17.0 mils. The distance between arms of adjacent conductors may be about 3 to 5 mils, so that each arm extends 6 to 7 mils from an edge of a conductor. The conductors are attached to a printed circuit board (not shown) for connection to the memory drive circuits. The board serves as a jig during manufacture of the grid and assembly of the grid to the ferrite post structure.

FIG. 4 illustrates the manner in which the conductor grid according to the present invention is used in a post and film memory system. The conductor grid includes a plurality of conductors 16 having a plurality of elliptical arms 15 extending orthogonally thereto. The post and film memory system includes a plate 17 having a plurality of ferrite posts 18 exhibiting a relatively low reluctance disposed thereon. For example, posts 18 may be fabricated by cutting slots 19 and 20 into a sheet of ferrite material to form posts 18 and orthogonal slots 19 and 20. The conductor grid pattern is assembled within slots 19 and 20 so that the elongated portions of the conductors lie within a set of slots between posts 18 and the respective arms extend into the intersecting orthogonal slots. By way of example, and in the case of conductors 16 illustrated in FIG. 4, conductors 16 are assembled into slots 20 between posts 18 and arms 15 extend into slots 19. Likewise, conductors 16a are assembled into slots 19 and arms **15*a* extend into slots 20. Preferably, an insulator layer 21, which may, for example, be constructed of suitable glass epoxy, polyimide, or the like, is sandwiched between conductors 16*a* and 16**.

The completed grid pattern, which is illustrated in the upper portion of FIG. 4, comprises conductors **16*a* having arms 15*a* extending orthogonally to the length of the conductor and a second plurality of conductors 16 having arm 15 extending orthogonally thereto. Insulator 21 is sandwiched between the flat portions of the conductors and the flat portions of the arms, so that the arms of one conductor do not contact the arms of an adjacent conductor, thereby prohibiting short-circuiting between conductors, Posts 18 are receivable snugly within aperture 22** formed by the conductor grid.

After assemblage of the grid pattern to the ferrite posts illustrated in the lower portion of FIG. 4, a layer (not shown) of material exhibiting a substantially rectangular hysteresis loop and a high remanence is positioned over surfaces 23 of posts 18 to complete the memory system. For further details of the printed circuit board and its assembly to the ferrite grid, reference may be had to the copending application of Barbero DiMartino et al., Ser. No. 161,757, filed July 12, 1971, for "Method Of Assembling A Slotted Member To A Grid Member", and assigned to the same assignee as the present invention.

As illustrated in FIG. 4, insulator layer 21 is sandwiched between the flat portions of the arm of one conductor and the body of the other conductor, as well as between the overlapped portions of the conductors themselves. This feature results in greater mechanical integrity of the grid system and reduces the likelihood of failure or breakage of conductors during assemblage of the grid pattern to slots 19 and 20 between ferrite posts 18. As a result, commercial assembly of the grids to the ferrite post structure is made possible, and the likelihood of failure in the system is substantially reduced.

This invention is not to be limited by the embodiment shown in the drawings and described in the description, which is given by way of example and not of limitation, but only in accordance with the scope of the appended claims.

What is claimed is:

1. In a memory system characterized by a plurality of posts constructed of relatively low reluctance material and a layer of material overlying said posts, said material exhibiting a substantially rectangular hysteresis loop characteristic and having a relatively high remanence, said posts being arranged in a pattern to form first and second pluralities of intersecting orthogonal slots, the improvement comprising: a conductor grid comprising a plurality of first elongated conductors disposed in respective ones of said first plurality of slots, each of said first conductors having a plurality of first arms orthogonal to the length of the respective first conductors, at least one of said first arms being located at each of a plurality of intersections between said first and second slots and extending into a respective one of said second slots, the first arms extending between adjacent first conductors being spaced apart so as not to make electrical contact between said adjacent first conductors.

2. Apparatus according to claim 1 wherein said grid further includes a plurality of second elongated conductors disposed in respective ones of said second plurality of slots, each of said second conductors having a plurality of second arms orthogonal to the length of the respective second conductor, at least one of said second arms being located at each of a plurality of intersections between said first and second slots and extending into a respective one of said first slots, the second arms extending between adjacent second conductors being spaced apart so as not to make electrical contact between said adjacent second conductors.

3. Apparatus according to claim 2 further including a layer of insulative material sandwiched between said first arms and said second conductors and between said second arms and said first conductors.

4. A conductor grid for a post and film memory system comprising: a plurality of first elongated conductors having a substantially flat portion, and a plurality of first arms extending from said first conductors orthogonally to the length of said first conductors, said first arms having a substantially flat portion lying in substantially the same plane as the flat portions of said first conductors, said first conductors and first arms being disposed in a predetermined pattern so as to be received in orthogonal slots between posts of the memory system so that said first arms extending between adjacent first conductors are spaced apart so as not to make electrical contact between said adjacent first conductors.

5. A grid according to claim 4 further including a plurality of second elongated conductors having a substantially flat portion, and a plurality of second arms extending from said second conductors orthogonally to the length of said second conductors, said second arms having a substantially flat portion lying in substantially the same plane as the flat portion of said second conductors, and insulator means sandwiched between the flat portions of said first conductors and said second arms and between the flat portions of said second conductors and said first arms.

6. A grid according to claim 5 wherein said first and second conductors and said first and second arms are disposed in a predetermined pattern to be received in orthogonal slots between posts of the memory system so that the arms extending between adjacent conductors are spaced apart so as not to make electrical contact between said adjacent conductors.

* * * * *